United States Patent
Lazatin et al.

(10) Patent No.: US 10,876,216 B2
(45) Date of Patent: Dec. 29, 2020

(54) LOW RESISTANCE INTERFACE METAL FOR DISK DRIVE SUSPENSION COMPONENT GROUNDING

(71) Applicant: Magnecomp Corporation, Murrieta, CA (US)

(72) Inventors: Marcos Lazatin, Wangnoi (TH); Brett Holaway, Wangnoi (TH)

(73) Assignee: Magnecomp Corporation, Murrieta, CA (US)

(*) Notice: Subject to any disclaimer, the term of this patent is extended or adjusted under 35 U.S.C. 154(b) by 129 days.

(21) Appl. No.: 15/444,000

(22) Filed: Feb. 27, 2017

(65) Prior Publication Data

US 2017/0298526 A1 Oct. 19, 2017

Related U.S. Application Data

(60) Continuation of application No. 13/953,590, filed on Jul. 29, 2013, now Pat. No. 9,583,125, which is a
(Continued)

(51) Int. Cl.
*C25D 3/48* (2006.01)
*C25D 5/02* (2006.01)
(Continued)

(52) U.S. Cl.
CPC ............ *C25D 3/48* (2013.01); *B23K 1/0016* (2013.01); *B23K 20/10* (2013.01); *C25D 5/022* (2013.01);
(Continued)

(58) Field of Classification Search
USPC ..................................... 204/224 R
See application file for complete search history.

(56) References Cited

U.S. PATENT DOCUMENTS 3,365,381 A * 1/1968 Fromson .................. B23H 3/02
205/642
3,645,861 A 2/1972 Garvey
(Continued)

FOREIGN PATENT DOCUMENTS

FR 2203891 A1 * 5/1974 ............... C25D 5/02
GB 1 395 146 A 5/1975

OTHER PUBLICATIONS

Siah et al, Silver Spot Plating Technique, Proceedings of the 4th Mechanical Engineering Research Colloquium, School of Mechanical Engineering, USM, Penang, Malaysia, Jan. 2005 (Year: 2005).*
(Continued)

*Primary Examiner* — Harry D Wilkins, III
(74) *Attorney, Agent, or Firm* — DLA Piper LLP (US)

(57) ABSTRACT

A stainless steel suspension component such as a mount plate is chemically activated by exposure to an activating solution. Gold is then spot plated onto the mount plate in the activated area using an elastomeric mask that is clamped over the mount plate. A component may then be bonded to the gold bond pads. The component may include a PZT microactuator bonded to the gold bond pads using a conductive adhesive such as silver epoxy. The gold acts as an interface metal that provides to a low resistance and environmentally robust ground path for the microactuator.

19 Claims, 7 Drawing Sheets

Related U.S. Application Data division of application No. 12/965,661, filed on Dec. 10, 2010, now abandoned.

(60) Provisional application No. 61/286,941, filed on Dec. 16, 2009.

(51) Int. Cl.

| | |
|---|---|
| *C25D 7/00* | (2006.01) |
| *C25D 5/12* | (2006.01) |
| *C25D 5/36* | (2006.01) |
| *C25D 5/50* | (2006.01) |
| *C25D 7/06* | (2006.01) |
| *G11B 5/48* | (2006.01) |
| *G11B 33/14* | (2006.01) |
| *B23K 1/00* | (2006.01) |
| *B23K 20/10* | (2006.01) |
| *B23K 101/38* | (2006.01) |

(52) U.S. Cl.
CPC .......... *C25D 5/12* (2013.01); *C25D 5/36* (2013.01); *C25D 5/50* (2013.01); *C25D 7/00* (2013.01); *C25D 7/0607* (2013.01); *G11B 5/483* (2015.09); *G11B 5/4873* (2013.01); *G11B 33/1493* (2013.01); *B23K 2101/38* (2018.08)

(56) References Cited

U.S. PATENT DOCUMENTS

| | | | |
|---|---|---|---|
| 3,745,105 A * | 7/1973 | Kosowsky | C25D 5/02 204/224 R |
| 3,755,089 A * | 8/1973 | Rapids | H05K 3/241 205/117 |
| 3,810,829 A * | 5/1974 | Fletcher | C25D 5/026 204/222 |
| 3,835,017 A * | 9/1974 | Mentone | C25D 5/022 204/224 R |
| 3,894,918 A * | 7/1975 | Corby | C25D 5/02 204/224 R |
| 3,974,056 A * | 8/1976 | Jogwick | C25D 5/02 204/207 |
| 4,033,833 A * | 7/1977 | Bestel | C25D 5/02 204/224 R |
| 4,033,844 A * | 7/1977 | Pantiga | C25D 5/02 204/206 |
| 4,049,471 A * | 9/1977 | Koontz | H01H 1/02 134/2 |
| 4,304,641 A | 12/1981 | Grandia et al. | |
| 4,367,123 A * | 1/1983 | Beck | C25D 5/08 204/224 R |
| 4,422,906 A | 12/1983 | Kobayashi | |
| 4,483,749 A * | 11/1984 | Shimamura | C25D 5/026 204/224 R |
| 4,497,692 A | 2/1985 | Gelchinski et al. | |
| 4,518,636 A * | 5/1985 | Richards | C25D 5/02 118/301 |
| 4,545,864 A * | 10/1985 | Richards | H01H 11/041 205/95 |
| 4,658,208 A | 4/1987 | Lee et al. | |
| 4,921,583 A * | 5/1990 | Sewell | C25D 5/022 204/206 |
| 5,045,167 A | 9/1991 | Palnik | |
| 5,138,431 A | 8/1992 | Huang et al. | |
| 5,183,724 A | 2/1993 | Johnson | |
| 5,305,043 A | 4/1994 | Johnson | |
| 5,372,700 A * | 12/1994 | Pilorge | C25D 5/026 204/224 R |
| 5,561,320 A | 10/1996 | Abbott et al. | |
| 5,705,043 A * | 1/1998 | Zwerner | C25D 5/022 204/202 |
| 5,710,456 A | 1/1998 | Abbott et al. | |
| 5,801,909 A | 9/1998 | Gray et al. | |
| 5,901,017 A | 5/1999 | Sano et al. | |
| 6,036,813 A | 3/2000 | Schulz et al. | |
| 6,046,888 A | 4/2000 | Krinke et al. | |
| 6,201,667 B1 | 3/2001 | Yamamoto et al. | |
| 6,256,170 B1 | 7/2001 | Honda | |
| 6,383,401 B1 | 5/2002 | Labzentis et al. | |
| 6,477,016 B1 | 11/2002 | Yamaguchi et al. | |
| 6,656,275 B2 | 12/2003 | Iwamoto | |
| 7,006,330 B1 | 2/2006 | Subrahmanyam et al. | |
| 7,111,386 B2 | 9/2006 | Chen et al. | |
| 7,148,085 B2 | 12/2006 | Abbott et al. | |
| 7,304,824 B2 | 12/2007 | Brink et al. | |
| 7,320,174 B2 | 1/2008 | Cowles et al. | |
| 8,542,465 B2 | 9/2013 | Liu et al. | |
| 8,553,364 B1 | 10/2013 | Schreiber et al. | |
| 8,665,567 B2 | 3/2014 | Shum et al. | |
| 8,885,299 B1 | 11/2014 | Bennin et al. | |
| 9,025,285 B1 | 5/2015 | Lazatin et al. | |
| 9,111,556 B1 | 8/2015 | Lazatin et al. | |
| 9,583,125 B1 | 2/2017 | Lazatin et al. | |
| 2002/0054460 A1 | 5/2002 | Takahashi et al. | |
| 2002/0075606 A1 | 6/2002 | Nishida et al. | |
| 2002/0115325 A1 | 8/2002 | Andric et al. | |
| 2002/0171968 A1 | 11/2002 | Nakagawa | |
| 2003/0074783 A1 | 4/2003 | Boismier et al. | |
| 2004/0113241 A1 | 6/2004 | Abbott et al. | |
| 2004/0145830 A1 | 7/2004 | Brink et al. | |
| 2004/0145930 A1 | 7/2004 | Noro | |
| 2004/0246623 A1 | 12/2004 | Yazawa | |
| 2006/0044695 A1 | 3/2006 | Erpelding | |
| 2007/0297094 A1 | 12/2007 | Sassine | |
| 2008/0285179 A1 | 11/2008 | Yamashita | |
| 2009/0086379 A1 | 4/2009 | Hanya et al. | |
| 2009/0196999 A1 | 8/2009 | Egli et al. | |
| 2010/0230144 A1 | 9/2010 | Schreiber et al. | |
| 2011/0228425 A1 | 9/2011 | Liu et al. | |
| 2011/0242708 A1 | 10/2011 | Fuchino | |

OTHER PUBLICATIONS

"Spot plating", Internet web page, retrieved Nov. 29, 2010 at http://spotplating.com.
Office Action in U.S. Appl. No. 12/965,661, dated Jun. 13, 2012.
Office Action in U.S. Appl. No. 12/965,661, dated Aug. 20, 2012.
Office Action in U.S. Appl. No. 12/965,661, dated Dec. 12, 2012.
Examiner's Answer to Appeal Brief in U.S. Appl. No. 12/965,661, dated May 22, 2013.
Office Action in U.S. Appl. No. 13/945,810, dated May 5, 2014.
Office Action in U.S. Appl. No. 13/945,810, dated Sep. 25, 2014.
Notice of Allowance in U.S. Appl. No. 13/945,810, dated Feb. 12, 2015.
First Action Interview Pilot Program Pre-Interview Communication in U.S. Appl. No. 13/953,590, dated Feb. 4, 2016.
First Action Interview Office Action Summary in U.S. Appl. No. 13/953,590, dated Apr. 8, 2016.
Office Action in U.S. Appl. No. 13/953,590, dated Aug. 24, 2016.
Notice of Allowance in U.S. Appl. No. 13/953,590, dated Jan. 4, 2017.
Notice of Allowance in U.S. Appl. No. 14/678,998, dated Jun. 18, 2015.

* cited by examiner

LOW RESISTANCE INTERFACE METAL FOR DISK DRIVE SUSPENSION COMPONENT GROUNDING

CROSS-REFERENCE TO RELATED APPLICATIONS

This application is a Continuation of U.S. application Ser. No. 13/953,590 filed Jul. 29, 2013, which is a Divisional of U.S. application Ser. No. 12/965,661 filed Dec. 10, 2010, which claims priority from U.S. Provisional Patent Application No. 61/286,941 filed Dec. 16, 2009, each of which is hereby incorporated by reference as if set forth in its entirety herein.

BACKGROUND OF THE INVENTION

1. Field of the Invention

This invention relates to the field of disk drive suspensions. More particularly, this invention relates to the field of a low resistance interface metal for disk drive suspension component grounding.

2. Description of Related Art

Good electrical connections must be made between a suspension's stainless steel (SST) body on the one hand, and other components such as suspension flexure circuit bond pads, grounding wires, flying leads, or microactuators such as piezoelectric (PZT) devices on the other hand. Microactuators are used to cause very fine control and movement of the suspension's read/write head, and are often mounted directly to the mount plate.

One prior art method of creating that electrical connection is by using silver (Ag) epoxy as an adhesive between the mount plate, which is grounded, and the other component. However, the inherently chromium (Cr) rich passivation layer which forms on the surface of the stainless steel tends to create a high resistance barrier on that surface. Some of the silver epoxies that have been used in the past as conductive adhesives suffer the drawback of having a resistance that increases in response to temperature, humidity, and/or time. One of the silver epoxies whose resistance increases the least over temperature, humidity, and time, suffers the additional disadvantage of containing mercury which must be handled as a hazardous material.

Designing a low resistance interconnect from the PZT to the mount plate is further complicated by the inherent mechanical strain induced by the 20 nm/V displacement of the PZT when driven up to 20 volts at an operational frequency of 1-30 KHz, which renders connections which rely on soft materials such as solder inadequate for the demanding cyclic loads experienced at the PZT/mount plate interface.

SUMMARY OF THE INVENTION

In the discussion that follows, the term "mount plate" shall be used for simplicity of discussion, it being understood that the term applies equally to a base or load beam portion of a suspension in a suspension design that does not use a traditional mount plate per se. Thus, the term "mount plate" as used in the disclosure herein and encompasses both a traditional mount plate as well as equivalent base portions in alternative suspension designs. Furthermore, some DSA suspension designs place the PZT entirely on the stainless steel load beam. The present invention is equally applicable to improving the connection between the PZT and the load beam in such designs.

According to the invention, a mount plate is chemically activated in a desired area and then spot plated with gold (Au) to form gold bond pads on the mount plate only in the area(s) where an electrical connection will be required. The mount plate can be a mount plate that has been previously stamped (formed). In an alternative embodiment that is currently believed to be less favored, the gold may be spot plated onto a mount plate that is thereafter stamped. In still a further embodiment, the mount plate is plated with gold, and the gold is thereafter stripped to leave only a gold bond pad in the particular area desired. In yet another embodiment this low resistance interfacial metal may be applied by laser brazing to either the raw stainless steel sheet stock before the mount plate or other components are formed into the sheet stock, or to an intermediate component.

The gold bond pads can then be used to bond the mount plate bond pads to any of flexure bond pads, gold plated flying leads, metalized surfaces of PZT microactuators, or other components. The gold plated bond pads can also be used for thermosonic welding of copper wires or other materials and structures to the gold bond pads, although gold-to-gold is generally preferred for thermosonic bonding. It is believed that the gold bond pads would also provide a viable solder interface to the stainless steel mount plate. The gold bond pads on the stainless steel mount plate have been experimentally determined to have much lower surface resistance than the silver epoxy bonds of the prior art, especially after prolonged exposure to humid environments.

In one aspect, the invention is of a disk drive suspension, the suspension having at least a portion thereof such as a mount plate comprising stainless steel, a portion of the stainless steel being chemically activated and then selectively plated with gold using an elastomeric plating mask, and an electrical component such as a PZT microactuator bonded to the gold bond pad such as by silver epoxy, the gold bond pad and the stainless steel mount plate providing a ground path for the microactuator, the gold bond pad providing an interface metal between the piezoelectric and the stainless steel that makes for a low resistance path to ground that is highly resistant to environmental degradation compared prior art techniques for bonding a microactuator to the stainless steel mount plate.

In another aspect, the invention is of a method of forming a ground connection to a stainless steel suspension component, the method comprising: chemically activating a stainless steel surface of the suspension component to produce a chemically activated surface thereof suspension component; pressing a resilient plating mask against the suspension component, the resilient plating mask having an aperture therein that extends to the chemically activated surface of the suspension component, the portion of the suspension within the aperture defining a plating surface; causing a gold electroplating electrolyte to flow into the aperture of the resilient plating mask and thereby contact the plating surface; electroplating gold onto the plating surface exposed within the aperture of the pliable plating mask to create a spot gold plated portion of the suspension component; and bonding an electrical component to the spot gold plated portion, the gold providing a high quality ground connection to the stainless steel component.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

According to the invention, a mount plate or its equivalent in a suspension for a disk drive such as a magnetic hard disk drive is spot plated with gold to create gold bonding pads on the mount plate. The result is that various components can be electrically bonded to the stainless steel mount plate via the low resistance, high bond quality metal interface.

Gold spot plating is, by itself, previously practiced in other contexts. Typical gold spot plating involves clamping a plating mask made of an elastomeric material such as precision molded silicone rubber that is opened and closed using a clamshell-type mechanism over the part. The silicone rubber creates a watertight seal preventing the covered portions of the part from being plated.

U.S. Pat. No. 7,148,085 issued to Abbott et al. discloses an integrated circuit leadframe that is gold spot plated by first covering the leadfame with a noble metal, preferably palladium, and then plating with gold only in the selected areas using a rubber mask that is clamped onto the lead frame, and a plating solution that is jetted at the exposed portion of the leadframe that is to be plated. The gold plated portion of the leadframe is then soldered using a tin/lead, tin/indium, tin/silver, tin/bismuth solder, or is attached using a conductive adhesive. U.S. Pat. No. 6,656,275 issued to Iwamoto discloses a portion gold plating system that plates gold only on the inner leads of a tape automated bonding (TAB) tape, by pressing a mask onto the tape and spraying a plating solution onto the tape through a hole. U.S. Pat. No. 5,305,043 issued to Johnson and U.S. Pat. No. 5,045,167 issued to Palnik also disclose spot plating using plating masks. These techniques, which do not involve gold being plated onto stainless steel, may be adapted and modified for use in the present invention.

Figure 1:
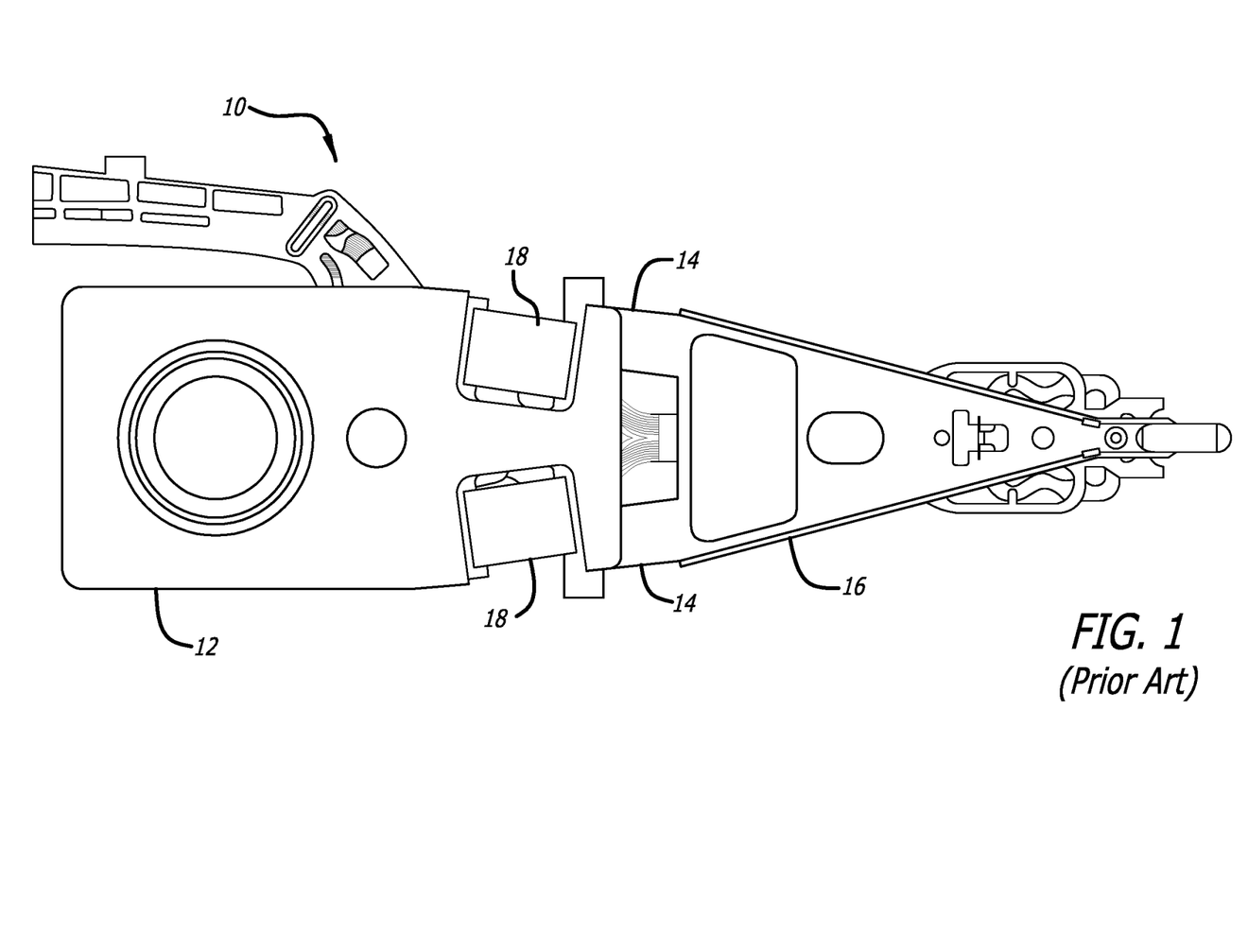
FIG. 1 is a top plan view of a prior art dual stage actuated suspension, to which the present invention may be applied.

FIG. 1 is a top plan view of a prior art dual stage actuated (DSA) suspension, to which the present invention may be applied. Suspension 10 includes a base plate 12, a load beam 16, a spring region 14 that defines a flexible hinge, and two piezoelectric (PZT) microactuators 18 disposed somewhere between mount plate 12 and load beam 16. Mount plate 12 is typically stainless steel. Typically, PZTs 18 are adhered to mount plate 12 via conductive silver epoxy, the epoxy contacting metallized surfaces of the PZT on one side and the surface of the stainless steel mount plate 12 on the other side.

It can be difficult to plate other metals directly onto stainless steel. In order to do so, the stainless steel must be specially prepared or activated. U.S. Pat. No. 4,422,906 issued to Kobayashi discloses a method for directly plating gold onto stainless steel, including activating the stainless steel surface prior to the plating operation. Kobayashi is hereby incorporated by reference for its teachings of preparing a stainless steel surface for gold plating, and for plating gold onto the stainless steel, as if fully set forth herein. Specifically, gold may be plated directly onto stainless steel using a method which comprises the steps of:

dipping or otherwise exposing stainless steel in an activating solution; subjecting the activated stainless steel to cathode electrolytic activation; and then, electroplating the cathodically electrolyzed stainless steel with gold.

The activating solution used in the first step is preferably an aqueous mixed acid solution containing, based on the weight of the solution:

(i) 3 to 20% by weight of hydrochloric acid;
(ii) 2 to 30% by weight of sulfuric acid;
(iii) 0.1 to 5% by weight of a nonionic or cationic surface active agent; and
(iv) 0.1 to 20% by weight of 2-pyrrolidone or its N-alkyl derivative.

More preferably, the activating solution used in the first step is an aqueous mixed acid solution containing, based on the weight of the solution:

(i) 3 to 10% by weight of hydrochloric acid;
(ii) 0.5 to 4% by weight of nitric acid;
(iii) 2 to 15% by weight of sulfuric acid;
(iv) 1 to 5% by weight of acetic acid;
(v) 3 to 10% by weight of citric acid;
(vi) 0.1 to 3% by weight of a nonionic or cationic surface active agent;
(vii) 0.1 to 10% by weight of 2-pyrrolidone or its N-alkyl derivative; and
(viii) 1 to 5% by weight of an acetylenic glycol.

In the present embodiment the gold layer is deposited onto the stainless steel mount plate using any suitable method, including without limitation the methods taught by Kobayashi. Once the stainless steel has been activated by exposure to the chemical activating solution, it can then be selectively gold plated.

Figure 2:
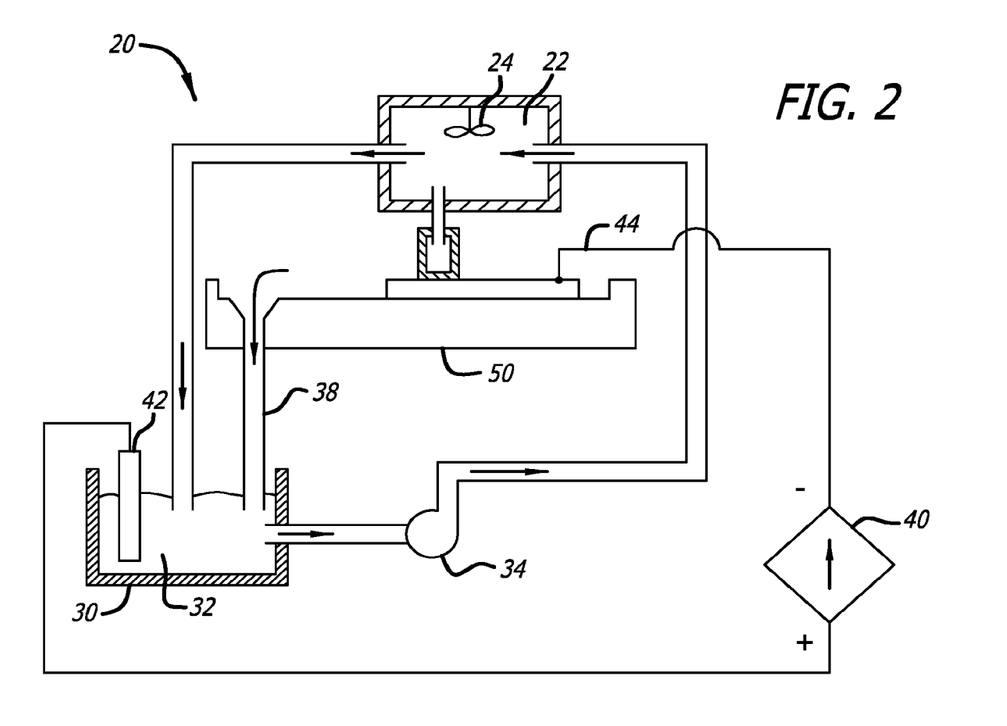
FIG. 2 is a graphical representation of a spot plating apparatus adapted for selectively metalizing a disk drive suspension according to one aspect of the invention.

FIG. 2 is a graphical representation of a spot plating apparatus adapted for selectively metalizing disk drive suspension mount plates or other suspension component according to one aspect of the invention. Spot plating apparatus 20 includes a spot plating cell 22, a stirrer 24 or other means to create turbulent flow for good mixing of the solution, an anode cell 30 having a plating anode 42, electrolytic gold plating solution 32, a pump 34, a controlled voltage source or controlled current source 40, a support tray 50 which may be raised and lowered, an electrical connection 44 from current source 40 through which the plating current will flow to the mount plate 12 or other suspension component (shown in FIG. 3), and resilient plating mask 36. Resilient mask 36 would typically, although not necessarily, take the form of a clamshell like device having two halves that are clamped together over the activated stainless steel suspension component. When the clamshell is opened, plating solution can be allowed to spill out and be collected by spill collection tube 38. Alternatively, plating mask 36 could be located above spot cell 22 so that electrolyte 32 runs out under force of gravity before plating mask 36 is opened, and/or pneumatic tubes could be used to clear the electrolyte from plating mask 36 before it is opened, in order to reduce or eliminate electrolyte spill.

Figure 3:
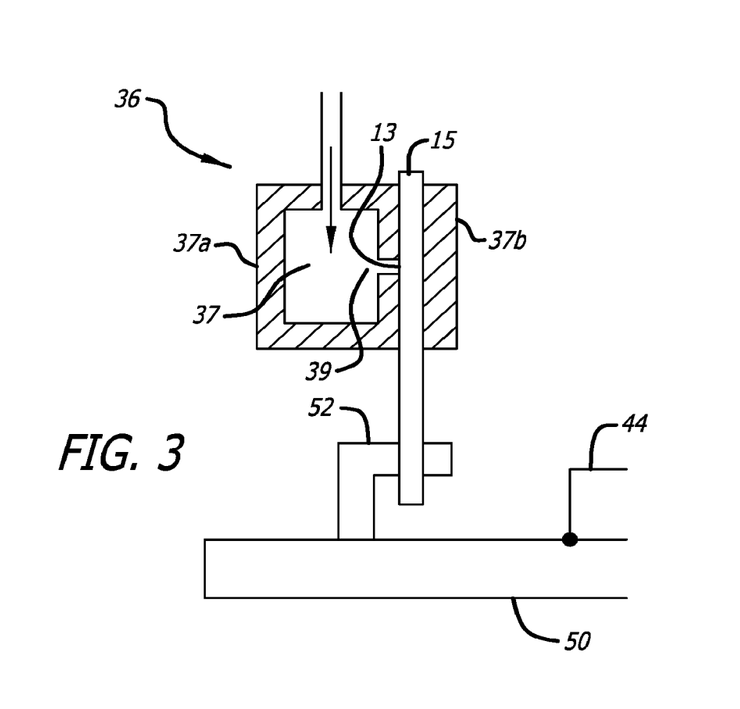
FIG. 3 is a simplified side cutaway view of the area around spot plating elastomeric plating mask 36 and the plating target in FIG. 2.

FIG. 3 is a simplified side cutaway view of the area around spot plating resilient plating mask 36 and the plating target in FIG. 2. The plating target 15 could be only mount plate 14 before it is welded to spring hinge 14 and load beam 16, or it could be a stock sheet of stainless steel material before that stock material is formed by patterning, etching, and working by stamping and/or bending, to form base plate 14, either separately from spring 14 and load beam 16 or integrally with it. Plating target 15 could also be a load beam or other component to which PZT 18, or other electrical component such as a flexible circuit lead, will be electrically connected. More generally, plating target 15 could be any stainless steel part.

In an illustrative embodiment, elastomeric plating mask 36 includes two halves that are clamped against opposite sides of plating target 15. One half includes a chamber 37 into which the electrolyte flows, and an aperture 39 that allows the electrolyte to reach the surface 13 which defines the area of plating target 15 to be gold plated. One the elastomeric plating mask 36 is clamped firmly in place, electrolyte is pumped into the chamber, voltage or current source 40 is turned on, and area 13 is plated to the desired plating depth. The plating process preferably plates area 13 on target 15 with at least 95% purity gold. This differs from gold plating techniques that have previously been used to plate gold onto stainless steel objects such as jewelry, in which typically a thin layer of copper is flash plated onto the stainless steel for wetting purposes, followed by a thin layer of nickel electrodeposited on the copper, and finally followed by an electrodeposited gold layer having a significant percentage of nickel and/or rhodium such that the electrodeposited gold layer is less than 95% gold, with the nickel layer acting to prevent migration of copper into the gold layer. Plating target 15 is held firmly by a mechanism such as clamp 52. The plating current flows through electrical connection 44, through support tray 50 which can be raised and lowered, and to plating target 15.

Figures 4, 5:
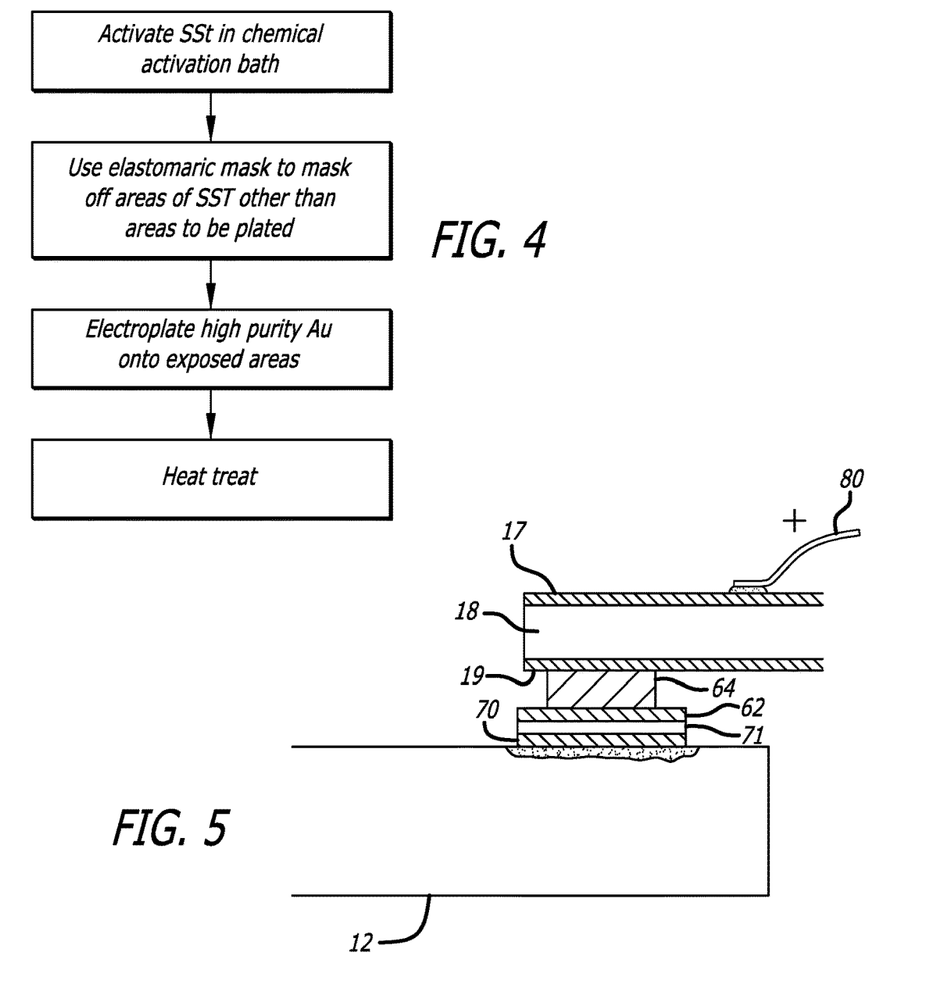
FIG. 4 is a flow chart of a process for selectively creating a low resistance metal interface on a suspension component according to the present invention.
FIG. 5 is a side cutaway view of a microactuator mounted to the suspension component according to the invention.

FIG. 4 is a chart of a process for selectively creating a low resistance metal interface on a suspension component according to the present invention. The process includes the steps of: chemically activating a stainless steel surface using a chemical activation bath; pressing an elastomeric mask to mask off areas of the stainless steel other than the area(s) to be plated; electroplating high purity gold onto the exposed areas; and heat treating the component.

FIG. 5 is a side cutaway view of a microactuator mounted to a selectively gold plated base plate according to the invention. Base plate 12 (or other portion of the suspension to which PZT 18 will be bonded) has activated area 60 which was activated by the activating solution, and gold layer 62 defining a gold bond pad that was electrodeposited in the plating apparatus 20 of FIG. 2 or other suitable apparatus. Silver epoxy 64 bonds the lower surface of PZT 18, which preferably has been metalized in order to conduct the actuation voltage over the entire surface of the PZT which defines the negative electrode of the PZT, to base plate 12. A microactuator driving voltage, shown being applied in generalized form as driving voltage lead wire 80, is electrically connected to $1^{st}$ metallized surface 17 of PZT 18. PZT 18 is grounded through its second metallized surface 19 to base plate 12 through gold bond pad 62. Also shown are intermediate metal layers 70, 71, such as copper and nickel, respectively, as will be discussed further below.

Preferably, after plating the stainless steel part is then heat treated. Heat treating produces a gold/SST alloy at the interface between the two metals. Gold layer 62 is preferably greater than 0.1 µm thick in order to maintain sufficient purity of the gold at the surface, even after taking into account some diffusion of gold into the stainless steel during subsequent heat treating. Also, gold layer 62 should be at least 0.1 µm thick to prevent too much of the gold from being removed by the chemical duburring process which is typically applied to suspensions prior to final assembly in order to minimize the shed of contaminating metal particles which could damage the hard disk surface.

Figure 6:
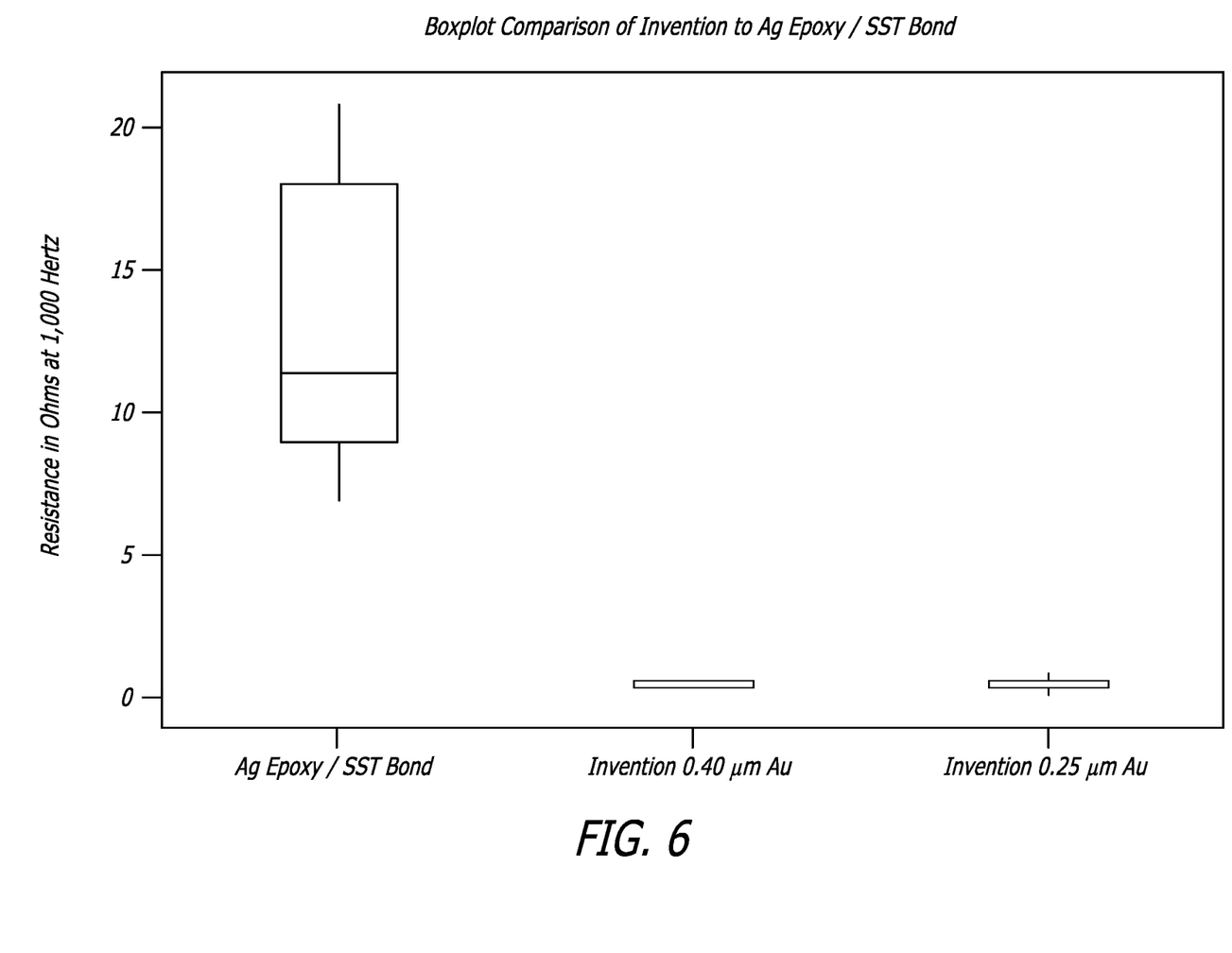
FIG. 6 is a graph of surface resistance of a suspension component having a low resistance interface metal bond pad according to the present invention, versus the surface resistance of a prior art electrical connection.

FIG. 6 is a boxplot of surface resistance of a gold bonding pad on a mount plate produced according to the present invention producing gold layers of 0.25 µm and 0.40 µm thick, versus the surface resistance of prior art electrical connection according to the prior art. The graph shows significantly reduced electrical resistance for electrical contacts to stainless steel according to the invention, than for the prior art connection of silver epoxy directly onto stainless steel. Specifically, resistance for contacts of the present invention utilizing gold layers of 0.40 µm and 0.25 µm thick, were both less than 1.0Ω, as compared to 9-18 Ω for the conventional contact of silver epoxy directly onto stainless steel. The test data therefore shows a dramatic improvement in the electrical contact from the PZT to the stainless steel using the invention. The test was conducted using a PZT driven at 1000 Hz, and measured per ASTM-8116 which specifies a 4-pin surface resistance measurement.

Additionally, HAST testing was performed on the connection of the invention, and the connection showed no visible corrosion. "HAST" stands for Highly Accelerated Stress Test, and involves passing an electrical current through a contact at elevated temperatures and humidity. The purpose is to approximate the effects of long term operational exposure under normal environmental (temperature and humidity) conditions.

HAST testing was performed at 130° C. and 100% relative humidity (RH) for 120 hours, for embodiments of the invention utilizing gold layers of 0.40 µm and 0.25 µm thick, and for contacts of the prior art, i.e., without gold plating. Post-HAST resistance was measured using an LCR meter. The results are presented in the graphs of FIGS. 7-9.

Figure 7:
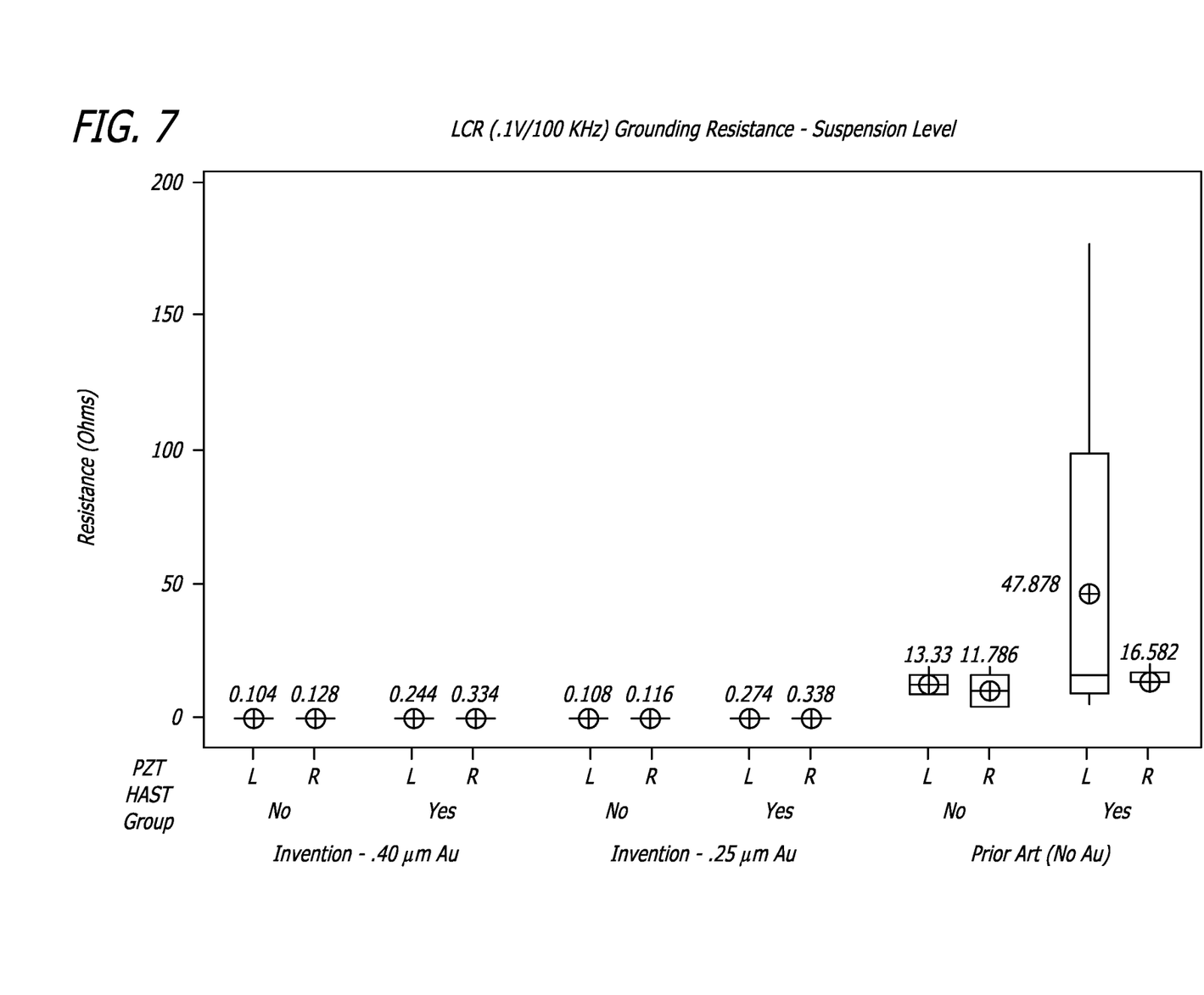
FIG. 7 is a box plot of post-HAST resistance at the suspension level of two improved contacts according to the present invention and a prior art contact, measured at electrical test conditions of 0.1 V and 100 KHz.

FIG. 7 is a box plot of post-HAST resistance at the suspension level of two improved contacts according to the present invention utilizing gold layers of 0.40 µm and 0.25 µm thick, and a prior art contact, measured at electrical test conditions of 0.1 V and 100 KHz.

Figure 8:
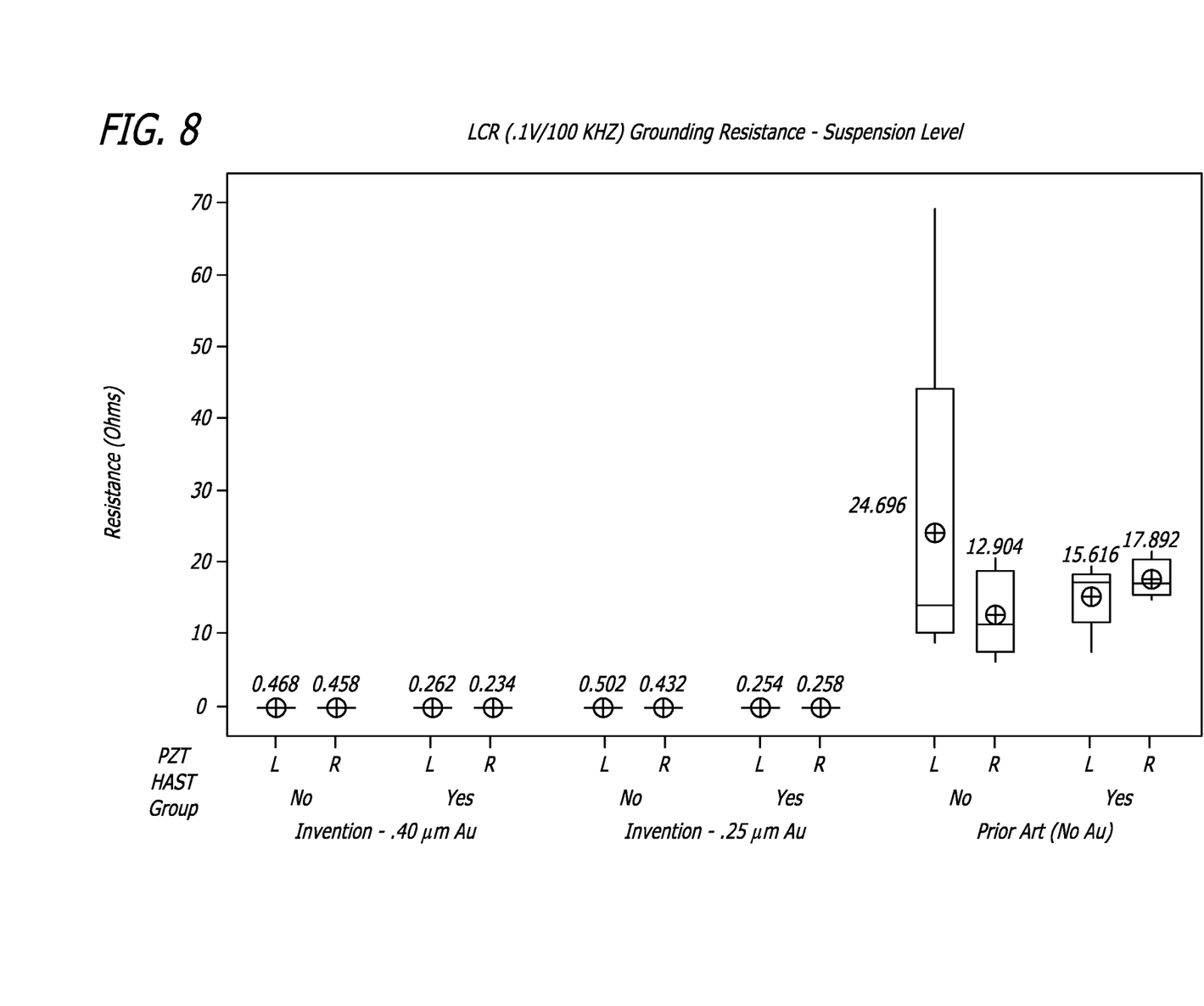
FIG. 8 is a box plot of post-HAST resistance at the suspension level of two improved contacts according to the present invention and a prior art contact, measured at electrical test conditions of 0.1 V and 1 KHz.

FIG. 8 is a box plot of post-HAST resistance at the suspension level of two improved contacts according to the present invention utilizing gold layers of 0.40 µm and 0.25 µm thick, and a prior art contact, measured at electrical test conditions of 0.1 V and 1 KHz.

Figure 9:
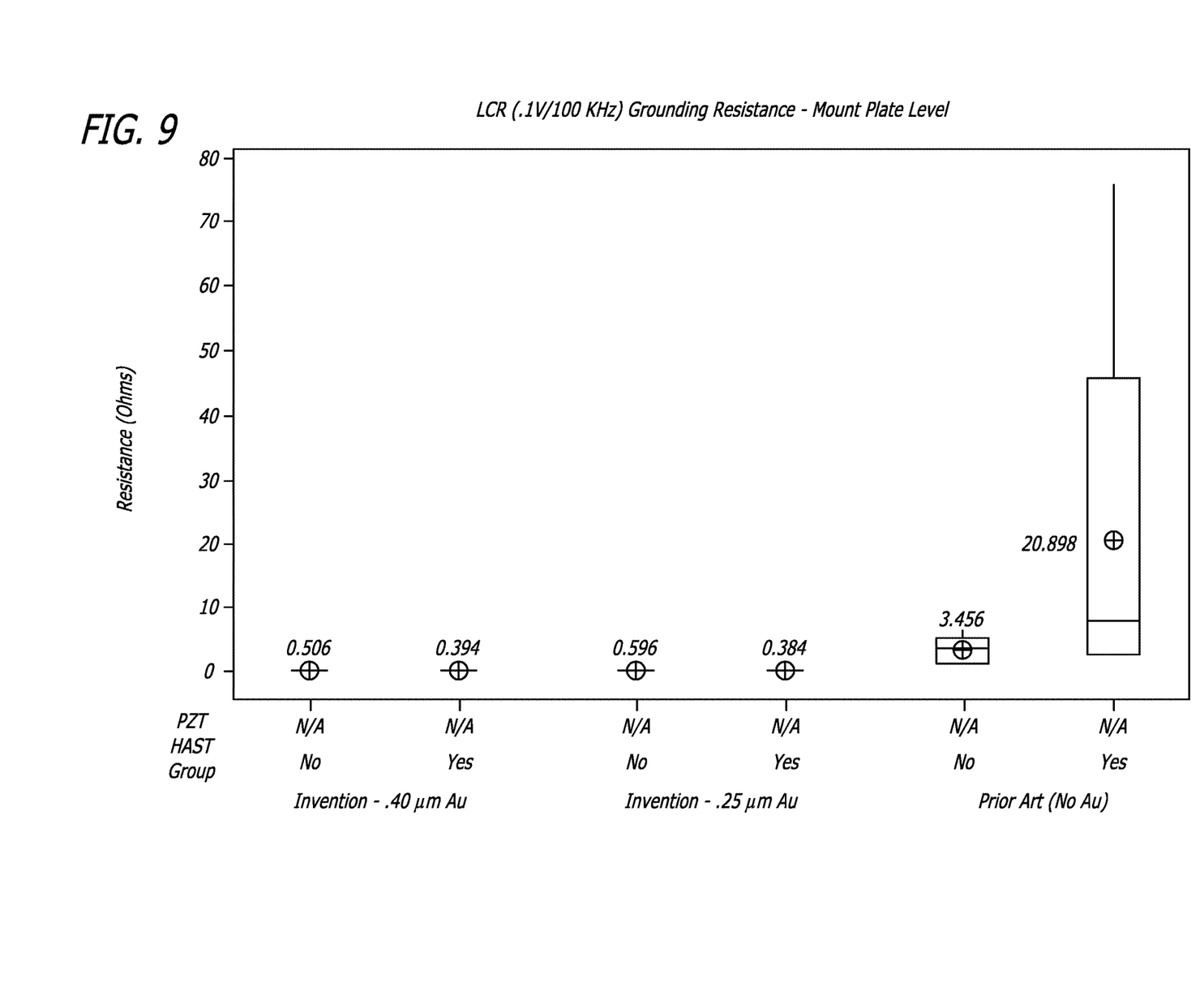
FIG. 9 is a box plot of post-HAST resistance at the mount plate level of two improved contacts according to the present invention and a prior art contact, measured at electrical test conditions of 0.1 V and 100 KHz.

FIG. 9 is a box plot of post-HAST resistance at the mount plate level of two improved contacts according to the present invention utilizing gold layers of 0.40 µm and 0.25 µm thick, and a prior art contact, measured at electrical test conditions of 0.1 V and 100 KHz.

As can be seen in the graphs, after HAST exposure the resistance of the contacts of the present invention were generally 1 to 2 orders of magnitude less than that of the contacts of the prior art. No significant increase in post-HAST resistance was found for the gold plated contacts. Additionally, no corrosion of any gold-plated contacts was found post-HAST, and no peeling or flaking of gold post-HAST was observed. These test results show the significant improvements obtained according to the present invention, both initially and especially after environmental testing.

As an alternative to plating gold directly on the stainless steel, an intermediate layer of copper and/or nickel may be strike plated upon the stainless steel lead in order to enhance the wetability of the stainless steel. The nickel may be plated using a Woods Strike bath which by itself is known, being described in U.S. Pat. No. 3,645,861 issued to Garvey, which is fully incorporated by reference as if set forth herein. Furthermore, the nickel may be plated using a variation on the standard Woods Strike taught by Garvey, in which the nickel chloride and hydrochloric acid are replaced with nickel bromide and hydrobromic acid, which Garvey discloses as producing better adhesion of the nickel to the stainless steel than the standard Woods Strike bath. According to Garvey, the preferred plating bath comprises:
100-800 g/l, and preferably about 500 g/l, of nickel bromide, and
0.2-20% by weight, and preferably about 0.4% by weight, hydrobromic acid with the plating taking place at a current density of 5-200 amp per square foot. The resulting metallization could therefore be: stainless steel (SST)/Au; SST/Ni/Au; SST/Cu/Au; SST/Cu/Ni/Au; SST/Ni/Cu/Ni/Au; or other variations that will be obvious to one skilled on the art after receiving the teachings of the present invention. The copper and/or additional nickel layers, when present, would constitute an intermediate metallic layer(s) between the stainless steel and the gold bond-receptive layer. FIG. 5 shows an example of such intermediate metallic layers. More specifically, the figure shows an intermediate metallic layer 70 of copper, and an intermediate metallic layer 71 of nickel thereon, before gold 62 is electroplated over nickel layer 71.

Although it is known to plate decorative SST and jewelry SST with gold, the requirements for plating a suspension SST mount plate are significantly different from plating decorative SST or jewelry SST at least for the reasons that decorative or ornate objects are not usually overplated with a high purity gold. Instead, such objects are typically overplated with gold alloys that contains nickel or rhodium. The alloying metals harden the gold for durability, render the gold plating more radiant, and lower the cost as compared to pure gold. Such objects also typically contain a Ni layer beneath the Au to stop migration of the typical Cu layer under the Ni into the Au. Such ornate objects may be of alloys. Often a thin, homogenous Cu flash deposited layer facilitates uniform wetting. These ornamental objects may have cores that are organics or plastic and which were made conductive by coating the plastic or other material with a carbon rich lacquer or a vacuum seeding process prior to electrodepositing the Cu/Ni/Au layers. Additionally, typically, a Wood's Ni Strike underlayer is applied to decorative SST and jewelry SST before the gold plating layer. Such a Woods Ni Strike underlayer prior to gold plating would preferably not be used on SST mount plates because Woods Ni can be high in chlorine, a highly reactive trace element that is generally unacceptable to the hard disk drive industry. Furthermore, the added layers and processing steps that are typically used to gold plate ornamental objects add cost to the final product. Such added cost may be acceptable for ornamental objects, whereas in contrast the hard disk drive suspension market is fiercely competitive.

Although the invention could theoretically be used to bond PZT's directly to a mount plate using thermosonic bonding, it is believed that the thermosonic bonding process may degrade the D31 (stroke length) of the PZT, or crack the ceramic PZT material.

Figure 10:
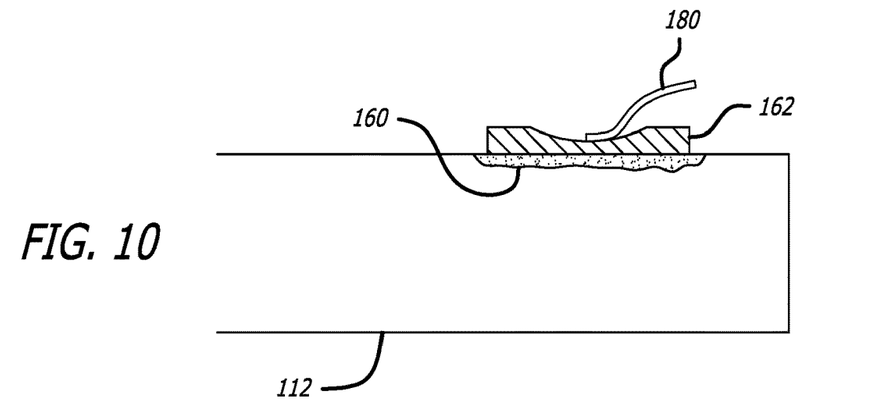
FIG. 10 is a side cutaway view of a wire bonded to a stainless steel suspension component according to the invention.

Although the invention is believed to be particularly useful for improving the quality of electrical bonds from microactuators such as PZTs to stainless steel suspension components, the invention could be advantageously used in other types of bonds as well. For example, as shown in FIG. 10 the gold plated stainless steel suspension component 112 could be bonded to gold or copper wires 180 by thermosonic bonding, or such wires 180 could be soldered to the gold contact pad 162 electroplated at chemically activated area 160. Still further, a component could be bonded to the gold contact pad via brazing, and particularly laser brazing. Alternatively, wire 180 could represent a suspension flexure circuit bond pad bonded to the component 112.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:
1. A spot plating apparatus comprising:
a spot plating cell configured to receive an electrolytic gold plating solution configured to be applied to a chemically activated stainless steel surface of a suspension component;
a resilient plating mask including a first section and a second section configured to separate from the first section, the first section including an inlet aperture configured to receive at least a portion of the electrolytic gold plating solution from the spot plating cell, and a chamber in fluid communication with the spot plating cell via the inlet aperture, the chamber including an outlet aperture, the suspension component is positioned between the first section and the second section such that the outlet aperture extends to at least one portion of the chemically activated surface of the suspension component, the at least one portion of the chemically activated surface of the suspension component defines a plating surface such that the electrolytic gold plating solution flows into the outlet aperture of the resilient plating mask and contacts the plating surface of the suspension component to electroplate gold onto the plating surface to create a spot gold plated portion of the suspension component; and an anode cell including a plating anode connected to a controlled electrical source, the anode cell is directly coupled to the spot plating cell, is configured to create the electrolytic gold plating solution, and is configured to be in fluid communication with the resilient plating mask such that when the first section is separated from the second section releasing suspension component the electrolytic gold plating solution flows into the outlet aperture of the resilient plating mask and into a spill collection tube in fluid communication with the anode cell.

2. The spot plating apparatus of claim 1, further comprising a chemical activating solution container including a chemical activating solution configured to chemically activate the stainless steel surface of the suspension component, the chemical activating solution includes:
   (i) 3 to 20% by weight of hydrochloric acid;
   (ii) 2 to 30% by weight of sulfuric acid;
   (iii) 0.1 to 5% by weight of a nonionic or cationic surface active agent; and
   (iv) 0.1 to 20% by weight of 2-pyrrolidone or its N-alkyl derivative, and
   the spot plating apparatus further includes:
   a component for heat treating the suspension component after the spot gold plated portion is created.

3. The spot plating apparatus of claim 1, wherein the suspension component is a suspension mount plate.

4. The spot plating apparatus of claim 1, wherein the suspension component is a suspension load beam.

5. The spot plating apparatus of claim 1 further comprising a ground connection to the suspension component, the ground connection configured to cause an electrical current to flow from the controlled electrical source through the spot plated gold portion of the suspension component.

6. A spot plating apparatus configured to form an electrical connection to a disk drive suspension body component, the spot plating apparatus comprising:
   a spot plating cell configured to receive gold plating solution configured to be applied to a chemically activated surface of the suspension body component;
   a resilient plating mask including a first section and a second section configured to separate from the first section, the first section including an inlet aperture configured to receive at least a portion of the gold plating solution, and a chamber in fluid communication with the spot plating cell via the inlet aperture, the chamber including an outlet aperture, the suspension component is positioned between the first section and the second section such that the outlet aperture extends to at least one portion of the chemically activated surface of the suspension component such that the gold plating solution flows into the outlet aperture of the resilient plating mask to coat the at least one portion with the gold plating solution to form a gold plated surface onto the chemically activated surface; and
   an anode cell including a plating anode connected to a controlled electrical source, the anode cell is directly coupled to the spot plating cell, is configured to create the gold plating solution, and is configured to be in fluid communication with the resilient plating mask such that when the first section is separated from the second section the gold plating solution flows into the outlet aperture of the resilient plating mask and into a spill collection tube in fluid communication with the anode cell.

7. The spot plating apparatus of claim 6, wherein the spot plating cell is configured to expose the suspension component to an activating solution and subject the suspension component to cathode electrolytic activation.

8. The spot plating apparatus of claim 6, wherein the resilient plating mask is an elastomeric plating mask.

9. The spot plating apparatus of claim 6, wherein the first section and the second section are configured to clamp against opposite sides of the suspension body component.

10. The spot plating apparatus of claim 9, wherein the first section includes a chamber for the gold plating solution to flow into from the inlet aperture.

11. The spot plating apparatus of claim 6, wherein the gold plated flat surface is formed after the suspension body component has been separated from a sheet of metal from which a plurality of such suspension body components are fabricated.

12. The spot plating apparatus of claim 6, wherein the resilient plating mask is located above the spot plating cell.

13. The spot plating apparatus of claim 12, wherein the gold plating solution flows out of the resilient plating mask under a force of gravity.

14. The spot plating apparatus of claim 12 further comprising pneumatic tubes coupled with the resilient mask for pumping the gold plating solution out of the resilient mask.

15. The spot plating apparatus of claim 6, wherein:
   the resilient plating mask is configured to isolate a plurality of separate locations on a sheet of metal from which the suspension body component will be formed.

16. The spot plating apparatus of claim 6, wherein the resilient plating mask is configured to press against the chemically activated surface, the portion of the suspension body component within the aperture defining a plating surface.

17. The spot plating apparatus of claim 6, wherein the suspension body component is a mount plate, and the mount plate includes a locally gold plated flat surface.

18. The spot plating apparatus of claim 6, wherein the suspension body component is a load beam, and the load beam includes a locally gold plated flat surface.

19. A spot plating apparatus configured to form a ground connection on a stainless steel disk drive suspension body for a microactuator, the spot plating apparatus comprising:
   a spot plating cell configured to receive a plating solution to be applied to a chemically activated surface of the stainless steel disk drive suspension body;
   a mask including a first section and a second section configured to separate from the first section, the first section including an inlet aperture configured to receive at least a portion of the plating solution, and a chamber in fluid communication with the spot plating cell via the inlet aperture, the chamber including an outlet aperture, the stainless steel disk drive suspension body is positioned between the first section and the second section such that the outlet aperture is aligned with a defined isolated portion of the stainless steel disk drive suspension body such that the gold plating solution flows into the outlet aperture of the mask to contact the isolated portion to plate a corrosion resistant metal onto the isolated portion of the stainless steel disk drive suspension body, thereby forming a corrosion resistant plated area on the disk drive suspension body to bond an electrode of the microactuator; and
   an anode cell including a plating anode connected to a controlled electrical source, the anode cell is directly coupled to the spot plating cell, is configured to create the plating solution, and is further configured to be in fluid communication with the mask such that when the first section is separated from the second section the plating solution flows into the outlet aperture of the mask and into a spill collection tube in fluid communication with the anode cell.

\* \* \* \* \*